United States Patent
Akai et al.

(10) Patent No.: US 9,054,550 B2
(45) Date of Patent: Jun. 9, 2015

(54) AUTOMOBILE CHARGING APPARATUS

(75) Inventors: Naruaki Akai, Kyoto (JP); Tomoyuki Kawase, Shiga (JP); Norio Abe, Shiga (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 466 days.

(21) Appl. No.: 13/515,165

(22) PCT Filed: Dec. 14, 2010

(86) PCT No.: PCT/JP2010/007251
§ 371 (c)(1),
(2), (4) Date: Jun. 11, 2012

(87) PCT Pub. No.: WO2011/074244
PCT Pub. Date: Jun. 23, 2011

(65) Prior Publication Data
US 2012/0293123 A1    Nov. 22, 2012

(30) Foreign Application Priority Data
Dec. 14, 2009    (JP) .................................. 2009-282512

(51) Int. Cl.
*H02J 7/00* (2006.01)
*H02J 7/02* (2006.01)
(Continued)

(52) U.S. Cl.
CPC ............... *H02J 7/027* (2013.01); *B60L 3/0069* (2013.01); *B60L 3/04* (2013.01); *B60L 11/1818* (2013.01); *B60L 2230/12* (2013.01);
(Continued)

(58) Field of Classification Search
CPC ...................................................... Y02T 90/14
USPC ........................................................ 320/109
See application file for complete search history.

(56) References Cited

U.S. PATENT DOCUMENTS

| 2008/0007878 | A1 | 1/2008 | Gandolfi et al. | |
|---|---|---|---|---|
| 2010/0033140 | A1* | 2/2010 | Otake | 320/165 |
| 2010/0225274 | A1* | 9/2010 | Fujitake | 320/109 |
| 2010/0295507 | A1* | 11/2010 | Ishii et al. | 320/109 |

FOREIGN PATENT DOCUMENTS

| CN | 1617407 A | 5/2005 |
|---|---|---|
| CN | 201312133 Y | 9/2009 |

(Continued)

OTHER PUBLICATIONS

Chinese Office Action and Search Report, and partial translation thereof, in corresponding Chinese Application No. 201080056862.6, dated Mar. 3, 2014, 8 pages.

(Continued)

*Primary Examiner* — Suresh Memula
(74) *Attorney, Agent, or Firm* — Brinks Gilson & Lione

(57) ABSTRACT

There are provided a control device, a power-supply cord, and a charging cable to be connected to an automobile, wherein the control device includes an electric-leakage detection portion for detecting an electric leakage in the charging cable or the automobile, a connection detection portion for detecting the charging cable being connected to the automobile, and a power-supply interruption portion for controlling supply of electricity from the power-supply cord to the charging cable, and, further, the control device has a function of activating the electric-leakage detection portion in a predetermined case, in a state where the automobile charging apparatus is supplied with a commercial power supply.

8 Claims, 4 Drawing Sheets

(51) Int. Cl.
  *B60L 3/00* (2006.01)
  *B60L 3/04* (2006.01)
  *B60L 11/18* (2006.01)
  *H02H 3/14* (2006.01)
  *H02H 3/16* (2006.01)

(52) U.S. Cl.
  CPC .............. *B60L 2250/10* (2013.01); *H02H 3/14* (2013.01); *H02H 3/16* (2013.01); *Y02T 10/7005* (2013.01); *Y02T 10/7088* (2013.01); *Y02T 90/121* (2013.01); *Y02T 90/14* (2013.01)

(56) References Cited

FOREIGN PATENT DOCUMENTS

| | | |
|---|---|---|
| JP | 07-123599 A | 5/1995 |
| JP | 07-274303 A | 10/1995 |
| JP | 08-033121 A | 2/1996 |
| JP | 2008-312380 A | 12/2008 |
| JP | 4254894 B1 | 4/2009 |
| JP | 2009-171733 A | 7/2009 |
| WO | WO 2009/014143 A1 | 1/2009 |

OTHER PUBLICATIONS

Office Action with Search Report for corresponding Chinese Application Serial No. 201080056862.6, dated Jul. 23, 2014, and translation of search report, 9 pages.

International Preliminary Report on Patentability in corresponding International Application No. PCT/JP2010/007251, dated Jun. 28, 2012, and English translation thereof, 14 pages.

Extended European Search Report in corresponding European Application No. 10837276.4, dated Nov. 4, 2014, 6 pages.

International Search Report for International Application No. PCT/JP2010/007251, dated Mar. 22, 2011, 2 pages.

* cited by examiner

AUTOMOBILE CHARGING APPARATUS

This application is a 371 application of PCT/JP2010/007251 having an international filing date of Dec. 14, 2010, which claims priority to JP2009-282512 filed Dec. 14, 2009, the entire contents of which are incorporated herein by reference.

TECHNICAL FIELD

The present invention relates to charging apparatuses for use in charging automobiles such as electric automobiles, hybrid automobiles, which are required to be charged by external commercial or facility power supplies.

BACKGROUND ART

A conventional charging apparatus for an electric automobile or a hybrid automobile has been structured to start driving its electric-leakage detection function and to determine whether or not there is an abnormality in the charging apparatus, in a state where the charging apparatus has been preliminarily connected to an external power supply, and the charging apparatus is also connected to an automobile, thereafter.

Alternatively, another charging apparatus has been structured to determine whether or not a charging system therein has an abnormality before the charging apparatus is connected to a power supply, when the charging apparatus is connected to an automobile in a state where the charging apparatus has not been preliminarily connected to the power supply (refer to Patent Literature 1, for example).

Patent Literature 1 Japanese Patent No. 4254894

SUMMARY OF THE INVENTION

Technical Problem

However, with the conventional structure, in a state where the charging apparatus has been preliminarily connected to the external power supply, but is not connected to the automobile thereafter, for example, in the event of the occurrence of an electric leakage due to a charging cable portion or in the event of the occurrence of an electric leakage from the power supply to the outer casing of the charging-apparatus main body, it is impossible to detect such electric leakages, which induces the problem that a user is influenced by such electric leakages when a user touches the charging cable or the outer casing of the charging-apparatus main body.

Further, the charging apparatus structured to determine whether or not there is an abnormality in the charging system therein before the charging apparatus is connected to the power supply is required to be supplied with a charging-apparatus driving power supply in the automobile, which results in consumption of electric power accumulated in a battery or the like in the automobile, thereby inducing the problem of reduction of the distance of travel, which is an inherent function of the automobile. In rare cases, such a charging apparatus itself includes a driving power supply, in order to eliminate the necessity of connecting the charging apparatus to an external power supply. However, in such cases, the charging apparatus should include an increased number of components and should have an enlarged and complicated configuration, thereby inducing the problems of poor reliability and poor usability.

The present invention was made in view of the above problems in the conventional techniques and aims at providing an automobile charging apparatus having enhanced safety, excellent reliability and excellent usability without degrading inherent functions of automobiles.

Solution to Problem

In order to attain the above object, an automobile charging apparatus according to the present invention includes a control device, a power-supply cord, and a charging cable to be connected to an automobile, wherein the control device includes an electric-leakage detection portion for detecting an electric leakage in the charging cable or the automobile, a connection detection portion for detecting the charging cable being connected to the automobile, and a power-supply interruption portion for controlling supply of electricity from the power-supply cord to the charging cable, and the control device has a function of activating the electric-leakage detection portion in a predetermined case, in a state where the automobile charging apparatus is supplied with a commercial power supply.

Accordingly, in any state, it is possible to overcome the problem that, in the event of the occurrence of an electric leakage due to the charging cable portion or in the event of the occurrence of an electric leakage from the power supply to the outer casing of the control device, for example, it is impossible to detect such electric leakages, which causes the user to be influenced by such electric leakages, when a user touches the charging cable or the outer casing of the control device. This enables the automobile charging apparatus to have enhanced safety.

Advantageous Effects of the Invention

With the automobile charging apparatus according to the present invention, it is possible to cause the automobile charging apparatus to have enhanced safety, thereby realizing enhancement of the reliability of the automobile charging apparatus.

Further, the automobile charging apparatus according to the present invention is enabled to have improved usability and a reduced size, thereby realizing enhancement of the durability of the automobile charging apparatus.

Further, with the automobile charging apparatus according to the present invention, it is possible to enhance the durability of the automobile-charging-apparatus main body at its portion which is connected to the charging cable, thereby realizing enhancement of the reliability of the automobile charging apparatus.

DETAILED DESCRIPTION OF THE PREFERRED EMBODIMENTS

An automobile charging apparatus according to the present invention includes a control device, a power-supply cord, and a charging cable to be connected to an automobile, wherein the control device includes an electric-leakage detection portion for detecting an electric leakage in the charging cable or the automobile, a connection detection portion for detecting the charging cable being connected to the automobile, and a power-supply interruption portion for controlling supply of electricity from the power-supply cord to the charging cable, and the control device has a function of activating the electric-leakage detection portion in a predetermined case, in a state where the automobile charging apparatus is supplied with a commercial power supply. This enables the automobile charging apparatus to have enhanced safety in any state, thereby enabling enhancement of the reliability of the automobile charging apparatus.

Further, the automobile charging apparatus may preferably be capable of generating a warning, before the charging cable is connected to the automobile.

Further, the predetermined case may be a case where the connection detection portion is detecting the charging cable as being unconnected to the automobile, in a state where the charging apparatus is supplied with the commercial power supply, for example. This enables the automobile charging apparatus to have enhanced safety in a state where the automobile is not connected to the charging apparatus, thereby enabling enhancement of the reliability of the automobile charging apparatus.

Further, the predetermined case may occur at constant time intervals, in a state where the charging apparatus is supplied with the commercial power supply, for example. This enables the automobile charging apparatus to have enhanced reliability and a reduced size.

Hereinafter, embodiments of the present invention will be described, with reference to the drawings. However, the present invention is not restricted by these embodiments.

First Embodiment

Figure 1:
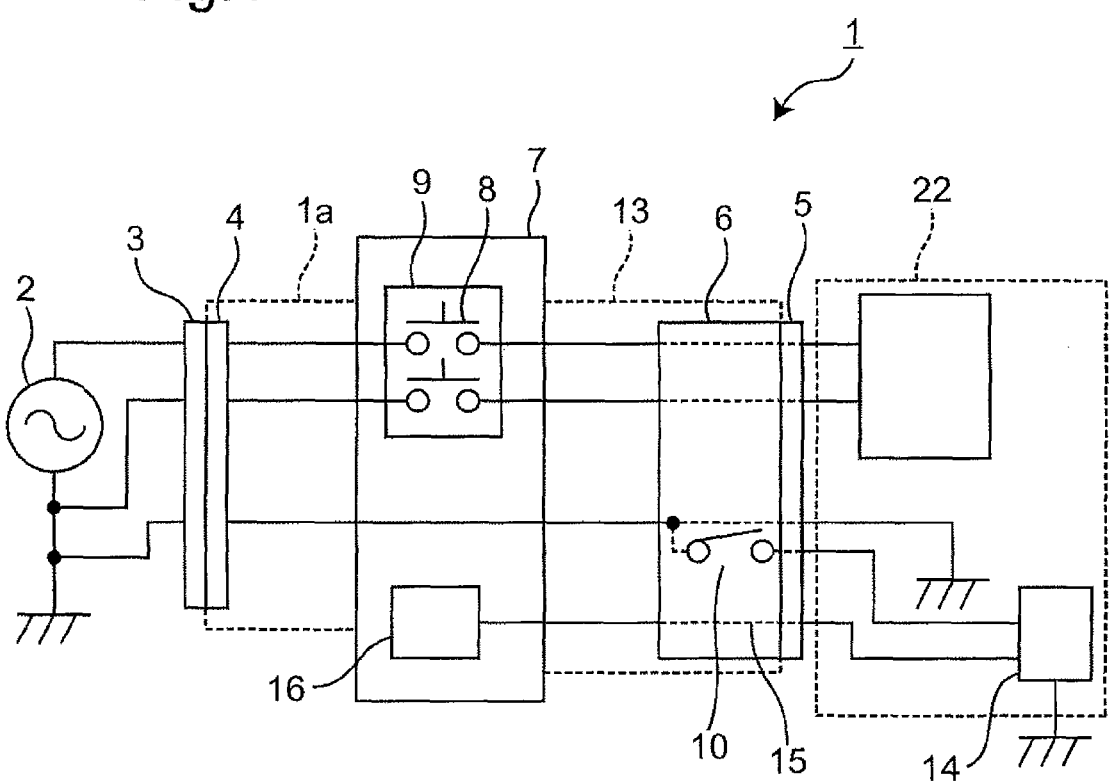
FIG. 1 is a schematic view of an automobile charging apparatus according to a first embodiment of the present invention.

FIG. 1 is a view schematically illustrating an automobile charging apparatus according to a first embodiment of the present invention.

Referring to FIG. 1, "1" designates the charging apparatus, wherein the charging apparatus 1 includes, at one end thereof, a plug 4 which is connected to an outlet 3 for an external power supply 2 through a power-supply cord 1a and, further, includes, at its other end, a charging port 6 which is connected to an inlet 5 in an electric automobile 22 or the like, through a charging cable 13. Further, the charging apparatus 1 includes a control device 7 which is adapted to control the operation of the charging apparatus 1 and, further, is adapted to start operating in a state where the plug 4 is connected to the outlet 3 for the external power supply 2, wherein the control device 7 includes, inside thereof, a CCID (Charging Circuit Interrupt Device) 9 which is constituted by a relay 8 and the like. Further, the charging port 6 in the charging apparatus 1 is provided with a switch 10 and, further, is structured to close the switch 10 when the charging port 6 in the charging apparatus 1 is correctly connected to the inlet 5 provided in the electric automobile.

Figure 2:
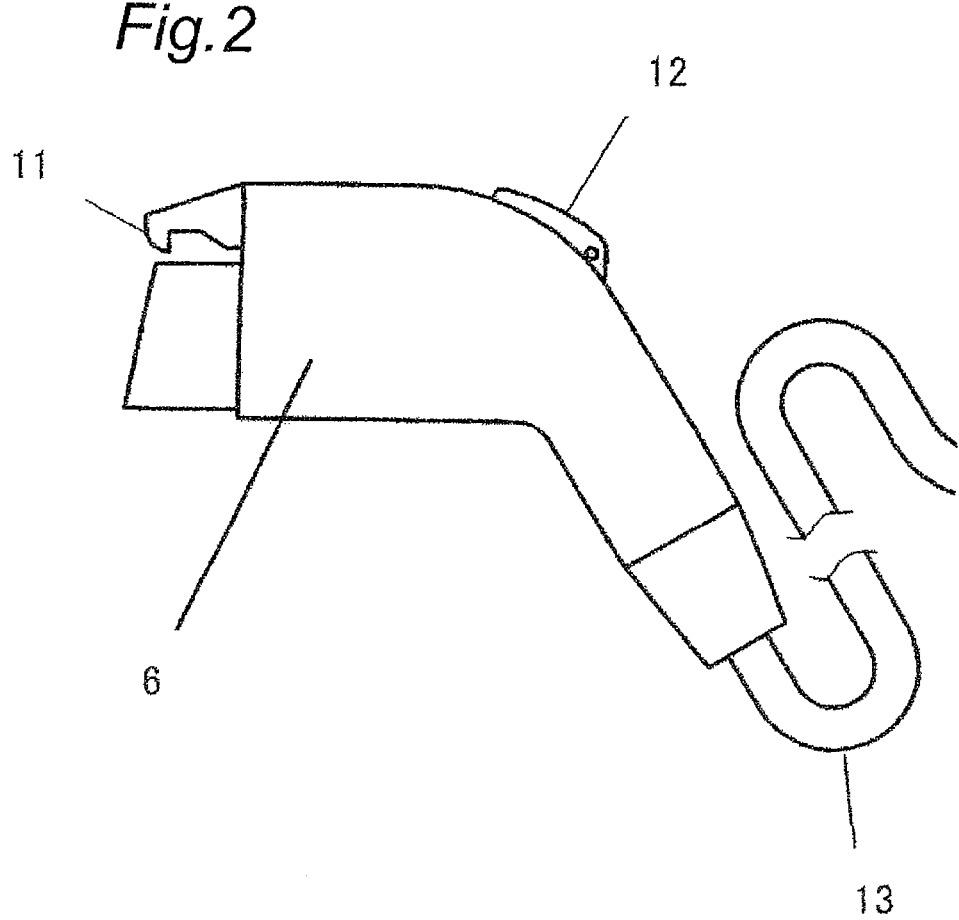
FIG. 2 is a view of the general outline of a charging port.

FIG. 2 is a view illustrating the general outline of the charging port 6. In this case, the switch 10 is structured to be opened and closed in conjunction with an engagement tool 11 for engaging the charging port 6 in the charging cable 13 with the inlet 5 in the electric automobile. Further, the engagement tool 11 is swayed, if a user pushes a button 12 provided in the charging port 6. For example, in a state where the charging port 6 in the charging apparatus 1 has been connected to the inlet 5 provided in the electric automobile, if the user release his or her finger from the button 12 of the charging port 6, the engagement tool 11 is engaged with the inlet 5 provided in the electric automobile and also, the switch 10 is closed. If the user pushes the button 12, this releases the engagement between the engagement tool 11 and the inlet 5 and, also, opens the switch 10.

Further, the method for opening and closing the switch 10 is not limited thereto. In the present embodiment, the switch 10 is structured to be physically turned on and off at its contact point, like a micro switch, but it is also possible to employ a switch which utilizes magnetism or a switch adapted to be electrically turned on and off, which can also offer the same effects. Further, the charging port 6 is structured to be connected to the control device 7 in the charging apparatus 1, through the charging cable 13.

On the other hand, the electric automobile is provided with an EV control device 14 inside thereof and, thus, is structured to detect, therewith, the switch 10 in the charging port 6 which has been closed.

Further, the charging port 6 in the charging apparatus 1 is provided with a control pilot signal terminal 15, which is electrically connected to a predetermined terminal in the electric automobile, when the charging port 6 is connected to the inlet 5 provided in the electric automobile. Further, the state of the connection therebetween is monitored by the EV control device 14 and by a control pilot circuit 16 inside the control device 7 in the charging apparatus 1.

Figure 3:
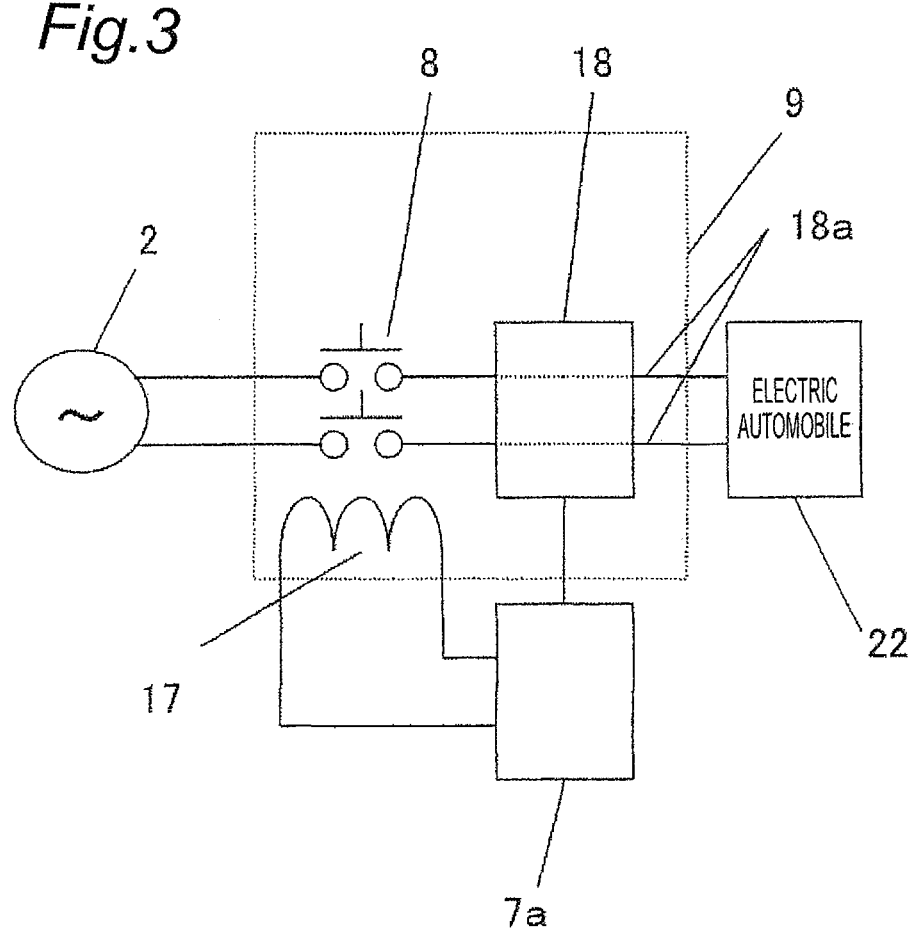
FIG. 3 is a schematic view of a CCID.

Next, FIG. 3 is a view schematically illustrating the interior of the CCID 9. The CCID 9 is activated by the control device 7, if the plug 4 in the charging apparatus 1 is connected to the outlet 3. Further, the CCID 9 is structured to interrupt the path for supplying electric power to the electric automobile from the external power supply 2, in a state where the relay 8 inside thereof is opened. On the other hand, in a state where the relay 8 is closed, the CCID 9 enables supply of electric power from the external power supply 2 to the electric automobile.

Further, the CCID 9 includes an electromagnetic coil 17 and an electric-leakage detection device 18, in addition to the relay 8. The electric-leakage detection device 18 for detecting the presence or absence of electric leakages is provided on a pair of power lines 18a for supplying charging electric power to the electric automobile 22 from the external power supply 2. More specifically, the electric-leakage detection device 18 is adapted to detect the state of balance between the currents flowing through the pair of power lines 18a in the opposite directions and, further, is adapted to detect the occurrence of an electric leakage, based on the occurrence of an electric field, in the event of disruption of the state of balance therebetween (in the event of the occurrence of an electric current leakage to a different electric network). If the electric-leakage detection device 18 detects an electric leakage, this fact is transmitted to a control portion 7a (for example, a microcomputer) included in the control device 7, which causes the control portion 7a to interrupt the energization of the electromagnetic coil 17, thereby turning off the relay 8.

Further, similarly to the control device 7, the electric-leakage detection device 18 is structured to start operating in a state where the plug 4 is connected to the outlet 3 for the external power supply 2 and, therefore, the electric-leakage detection device 18 is enabled to generate warnings, even before the charging cable is connected to the electric automobile.

Figure 4:
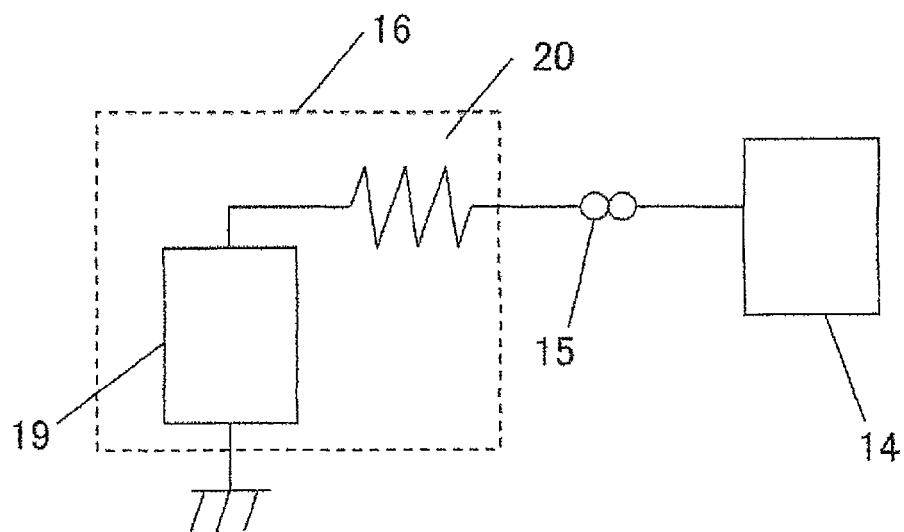
FIG. 4 is a schematic view of a control pilot circuit.

Next, the control pilot circuit 16 will be described, in detail. Referring to FIG. 4, the control pilot circuit 16 includes, inside thereof, an oscillator 19 and a resistor element 20 and, further, is structured to be connected to the predetermined terminal in the electric automobile through the control pilot signal terminal 15. The oscillator 19 is operated by electric power supplied from the external power supply 2.

Further, the oscillator 19 outputs a non-oscillated signal, when the electric potential outputted from the resistor element 20 is around a predefined electric potential V1 (for example, 12 V). Further, when the electric potential outputted from the resistor element 20 drops from V1 (when the control pilot signal terminal 15 is connected to the predetermined terminal in the electric automobile), the oscillator 19 outputs a signal oscillating at a predetermined frequency (for example, 1 kHz) and with a predetermined duty cycle.

Specifically, when the electric potential of the control pilot signal is around V1, the control pilot circuit 16 does not oscillate the control pilot signal. When the electric potential of the control pilot signal drops from V1 and changes to around V2 (for example, 9V), the control pilot circuit 16 oscillates the control pilot signal at a predetermined frequency and at a predetermined duty cycle.

Further, the electric potential of the control pilot signal can be also manipulated by changing the resistance value of a resistance electric network (not illustrated) in the electric automobile. Specifically, if the resistance value of the resistance electric network is controlled to be lowered by the EV control device 14 in the electric automobile, this lowers the electric potential of the control pilot signal. On the other hand, if the resistance value of the resistance electric network is controlled to be heightened, this will heighten the electric potential of the control pilot signal.

Further, when the plug 4 in the charging apparatus 1 is connected to the outlet 3, even when the charging port 6 is disengaged from the inlet 5 provided in the electric automobile, the control pilot circuit 16 is controlled, by the control device 7, such that it can output a constant control pilot signal. However, as a matter of course, in the state where the charging port 6 is disengaged from the inlet 5 provided in the electric automobile, the EV control circuit 14 cannot detect the control pilot signal being outputted therefrom, due to the absence of electric connection thereto.

Further, the electric automobile is notified of the electric-current capacity of the charging apparatus 1 (the value of the electric current which can be supplied from the charging apparatus 1), through the pulse width of the control pilot signal. This is effective means for transmitting the capacity of a commercial power supply to the electric automobile. Further, the pulse width of the control pilot signal has a constant value, independently of the voltage of the external power supply 2.

On the other hand, if the charging apparatus 1 used therein is of a different type, the control pilot signal can have a different pulse width. In other words, the pulse width of the control pilot signal can be defined, for every type of the charging apparatus.

The control pilot circuit 16 supplies an electric current to the electromagnetic coil 17, when the electric potential of the control pilot signal is around a predefined electric potential V3 (for example, 6 V), as a result of a changeover of the resistance electric network by the effect of the EV control device 14. When the electromagnetic coil 17 is supplied with electric power from the control pilot circuit 16, the electromagnetic coil 17 generates an electromagnetic force, thereby closing the relay 8. This enables supply of electric power to the electric automobile, thereby starting charging thereof.

As described above, with the electric automobile charging system according to the present embodiment, the control device 7 in the charging apparatus 1 is capable of detecting the presence or absence of electrical or mechanical connection between the charging apparatus 1 and the electric automobile. Generally, it is common practice to perform, after the completion of connection therebetween, activation/non-activation of the electric-leakage detection function in conjunction with the operation of the control pilot circuit 16, for example. However, in the present embodiment, in a state where the charging apparatus 1 has been preliminarily connected to the external power supply 2, the control device 7 activates the electric-leakage detection function using the CCID 9, regardless of whether or not it is connected to the electric automobile, thereafter. Accordingly, even in the event of the occurrence of an electric leakage mainly due to the charging port 6 or the charging cable 13, or even in the event of the occurrence of an electric leakage from the external power supply 2 to the outer casing of the charging apparatus 1, for example, it is possible to detect such electric leakages, which enables preventing dangerous occurrences due to such electric leakages when the user touches the charging apparatus 1 or the outer casing thereof.

The scope of the present embodiment is defined by the claims, not by the aforementioned description and, also, can include all changes having equivalent meanings to those of the claims and falling within the claims, which induces no alienation from the concept of the present invention and no change in effect. Further, other respective portions can have any structures, provided that they fall within a scope capable of attaining the aim of the present embodiment.

Second Embodiment

Figure 5:
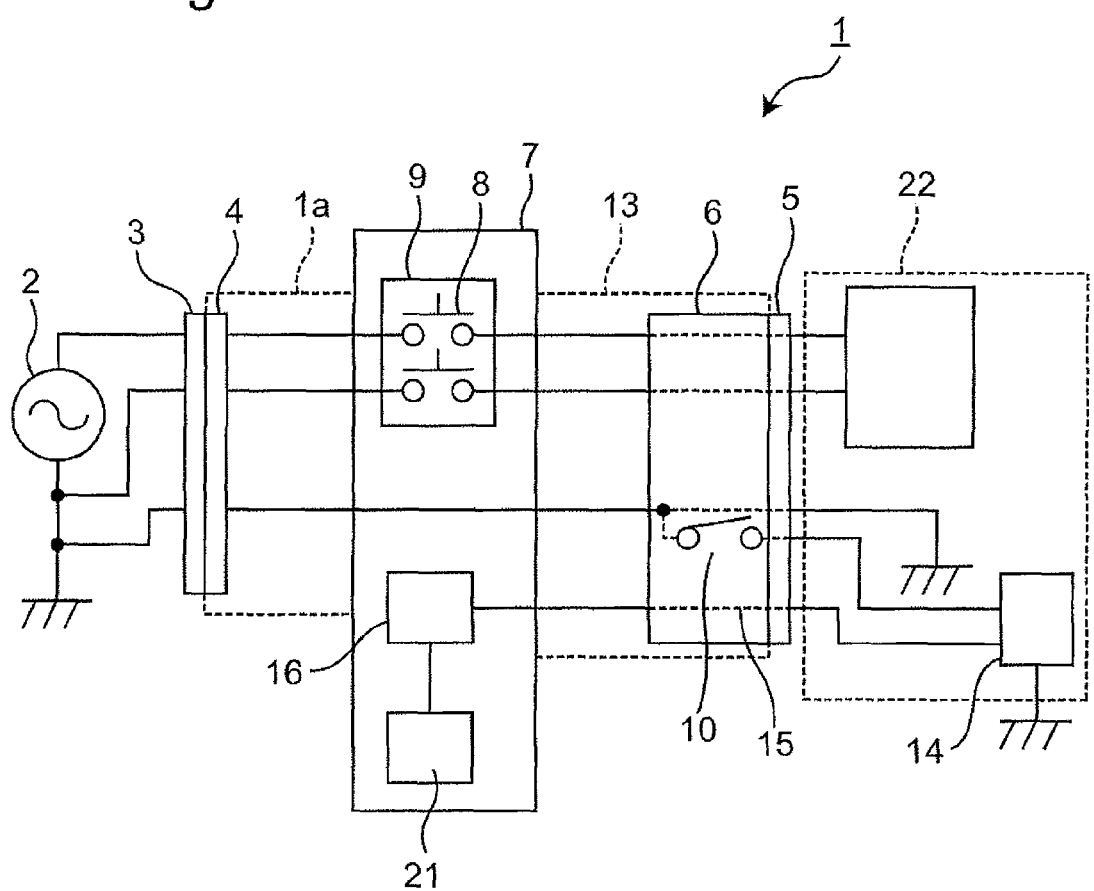
FIG. 5 is a schematic view of an automobile charging apparatus according to a second embodiment of the present invention.

Referring to FIG. 5, "21" designates timer means which is adapted to perform time measurement and to be controlled by the aforementioned control device 7 and, further, is adapted to transmit the measured time to the control device 7. The other structures thereof are the same as those in the first embodiment.

The timer means 21 is adapted to operate, on receiving, from the control device 7, commands for measurement of time periods, which are the time period which has elapsed since the plug 4 was connected to the outlet 3, the time period which has elapsed since the start of supply of the external power supply 2 to the charging apparatus 1, the time period which has elapsed since the control pilot signal terminal 15 was connected to a predetermined terminal in the electric automobile, and the time period which has elapsed since the voltage of the control pilot circuit 16 was changed due to the effects of the oscillator 19, the resistor element 20 and the resistance electric network in the electric automobile and the like.

With the aforementioned structure, in a state where the charging port 6 is not connected to the inlet 5, namely in a state where the charging apparatus 1 has been preliminarily connected to the external power supply 2, even when the charging apparatus 1 is detected as being unconnected to the electric automobile, thereafter, it is possible to exert the electric-leakage detection function at predetermined time intervals, due to the function of the timer means 21.

This enables realization of confirmations of safety of the apparatus at regular intervals, thereby improving the reliability of the apparatus.

Further, it is possible to simplify the structure of the charging apparatus 1 having no power supply inside thereof, which can cause the apparatus to be lightweight and to have improved reliability, durability and usability.

Although the aforementioned embodiment has been described with respect to a case where electric-leakage detection is performed at predetermined time intervals, it is also possible to continuously perform electric-leakage detection, which can also offer the same effects, as a matter of course.

The scope of the present embodiment is defined by the claims, not by the aforementioned description and, also, can include all changes having equivalent meanings to those of the claims and falling within the claims, which induces no alienation from the concept of the present invention and no change in effect. Further, other respective portions can have any structures, provided that they fall within a scope capable of attaining the aim of the present embodiment.

INDUSTRIAL APPLICABILITY

As described above, with the automobile charging apparatus according to the present invention, in a state where it is supplied with a commercial power supply, it is possible to activate the electric-leakage detection portion in a predetermined case for detecting electric leakages, which can cause the apparatus itself to have improved safety, reliability, durability and usability. Accordingly, the present invention can be sufficiently adapted to apparatuses adapted to be used by being connected to power supplies, such as automobile inspection devices, and, also, to detachable power-supply cords for various types of facilities, as well as to automobile charging apparatuses.

REFERENCE SIGNS LIST

1 Charging apparatus
1a Power-supply cord
2 External power supply
3 Outlet
4 Plug
5 Inlet in an electric automobile or the like
6 Charging port
7 Control device
7a Control portion
8 Relay
9 CCID
10 Switch
11 Engagement tool
12 Button
13 Charging cable
14 EV control device
15 Control pilot signal terminal
16 Control pilot circuit
17 Electromagnet coil
18 Electric-leakage detection device
18a Pair of power lines
19 Oscillator
20 Resistance element
21 Timer means
22 Electric automobile

The invention claimed is:

1. An automobile charging apparatus comprising:
a control device,
a power-supply cord adapted to supply a commercial power to the control device, and
a charging cable adapted to connect between the control device and an automobile so that the automobile is supplied with the power,
wherein the control device includes:
an electric-leakage detection portion for detecting an electric leakage in the charging cable or the automobile on the basis of a state of currents flowing through power lines for supplying the power to the charging cable,
a connection detection portion for detecting the charging cable being connected to the automobile, and
a power-supply interruption portion adapted to interrupt supplying the commercial power to the power lines when the electric-leakage detection portion detects an electric leakage, and
the control device has an electric-leakage detection function for detecting the state of currents flowing through the power lines at predetermined time intervals before the charging cable is connected to the automobile, in a state where the control device is supplied with the commercial power.

2. The automobile charging apparatus according to claim 1, wherein the automobile charging apparatus is configured to be capable of generating a warning when the electric-leakage detection portion detects an electric leakage, before the charging cable is connected to the automobile.

3. The automobile charging apparatus according to claim 1, wherein the electric-leakage portion detects the state of balance between the currents flowing through the power lines at predetermined time intervals when the connection detection portion is detecting the charging cable as being unconnected to the automobile.

4. The automobile charging apparatus according to claim 1, wherein the electric-leakage detection portion detects the state of balance between the currents flowing through the power lines at predetermined time intervals when the connection detection portion is detecting the charging cable as being unconnected to the automobile.

5. The automobile charging apparatus according to claim 2, wherein the electric-leakage detection function is activated at constant time intervals.

6. The automobile charging apparatus according to claim 2, wherein the electric-leakage detection function is activated at constant time intervals.

7. The automobile charging apparatus according to claim 3, wherein the electric-leakage detection function is activated at constant time intervals.

8. The automobile charging apparatus according to claim 4, wherein the electric-leakage detection function is activated at constant time intervals.

* * * * *